United States Patent
Venkateswaran et al.

(10) Patent No.: US 11,300,481 B2
(45) Date of Patent: Apr. 12, 2022

(54) METHOD AND SYSTEM FOR PREDICTING FAILURES IN DIVERSE SET OF ASSET TYPES IN AN ENTERPRISE

(71) Applicant: Wipro Limited, Bangalore (IN)

(72) Inventors: Bavya Venkateswaran, Chennai (IN); Anindito De, Chennai (IN)

(73) Assignee: Wipro Limited, Bangalore (IN)

( * ) Notice: Subject to any disclaimer, the term of this patent is extended or adjusted under 35 U.S.C. 154(b) by 433 days.

(21) Appl. No.: 16/298,704

(22) Filed: Mar. 11, 2019

(65) Prior Publication Data

US 2020/0240875 A1 Jul. 30, 2020

(30) Foreign Application Priority Data

Jan. 25, 2019 (IN) .............................. 201941003214

(51) Int. Cl.
*G06F 11/30* (2006.01)
*G01M 99/00* (2011.01)

(52) U.S. Cl.
CPC ................................ *G01M 99/005* (2013.01)

(58) Field of Classification Search
CPC .................................................. G01M 99/005
See application file for complete search history.

(56) References Cited

U.S. PATENT DOCUMENTS

| 6,810,406 B2* | 10/2004 | Schlabach ........... B61L 27/0094 |
| 2014/0200952 A1 | 7/2014 | Hampapur et al. |
| 2014/0281713 A1 | 9/2014 | Hampapur et al. |
| 2017/0308802 A1* | 10/2017 | Ramsoy ................ G06N 20/10 |
| 2017/0344411 A1 | 11/2017 | Lee et al. |
| 2018/0005151 A1* | 1/2018 | Liao .................... G06Q 10/0637 |
| 2020/0241490 A1* | 7/2020 | Jermann .............. G05B 23/024 |

* cited by examiner

*Primary Examiner* — Phuong Huynh
(74) *Attorney, Agent, or Firm* — Finnegan, Henderson, Farabow, Garrett & Dunner, LLP

(57) ABSTRACT

Disclosed herein is a method and a failure prediction system for predicting failures in a diverse set of asset types in an enterprise. In an embodiment, asset information related each assets are analyzed for determining an asset type and a failure mode of each of the assets. Thereafter, one of a plurality of prediction models is selected for predicting failures in each of the assets based on the asset type and the failure mode of each of the assets. Finally, selected one of the plurality of prediction models is used to analyze the asset information for predicting the failures in each of the assets. In an embodiment, the present disclosure provides a universal failure prediction system for predicting failures in the diverse set of asset types and thereby eliminates requirement of using multiple prediction systems for predicting failures in each type of the assets.

22 Claims, 7 Drawing Sheets

METHOD AND SYSTEM FOR PREDICTING FAILURES IN DIVERSE SET OF ASSET TYPES IN AN ENTERPRISE

This application claims the benefit of Indian Patent Application Serial No. 201941003214 filed Jan. 25, 2019, which is hereby incorporated by reference in its entirety.

FIELD

The present subject matter is, in general, related to enterprise asset management and more particularly, but not exclusively, to a method and system for predicting failures in a diverse set of asset types in an enterprise.

BACKGROUND

Presently, there is an advent of shift from reactive asset maintenance to proactive asset-failure prediction in an enterprise. There are numerous asset-failure prediction solutions currently available in the industry. These prediction solutions obtain information about working condition and life of an asset and perform various analysis including reliability centric maintenance, condition-based monitoring and predictive maintenance. Further, the prediction solutions also estimate operational costs, remaining useful life and safety factors of the asset. However, the existing prediction solutions are very specific to asset types and are designed to analyze and predict failures in the assets belonging to a particular asset type.

Typically, attributes that define the operating conditions will be different for different types of assets. Similarly, the failure patterns and modes of failure will also be different for the different type of assets. Moreover, in large organizations, different individual assets, even when they belong to the same type, would have been sourced from different manufacturers. Consequently, these assets may generate data in different forms as they have different specifications and manufacturer-specific configuration. In all the above scenarios, different data interpretation, different processing logic and different statistical models will be required for predicting the failures in each type of assets. This requires the organizations to develop, deploy, operate and maintain different systems and applications to predict failures in different types of assets.

However, in large organizations, costs and efforts required for setting up these many failure prediction systems are multiplied by many folds. For example, a large water utility provider having thousands of assets like reservoir, pipeline, pumps, turbines and valves, must deploy and maintain a large number of failure prediction systems, with huge costs involved. This multiplicity of failure prediction systems is thus a major technical shortcoming in the current state of the art with respect to proactive asset-failure prediction systems in large enterprises. Therefore, there is a need for a failure prediction system which can predict failures in the assets, irrespective of the type of the assets.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method of predicting failures in a diverse set of asset types in an enterprise. The method comprises receiving, by a failure prediction system, asset information related to one or more assets from one or more data sources associated with the one or more assets. The one or more assets belong to one or more asset types. Subsequent to receiving the asset information, the method comprises determining an asset type and a failure mode of each of the one or more assets based on analysis of the asset information. Thereafter, the method comprises selecting one of a plurality of prediction models for predicting failures in each of the one or more assets based on the asset type and the failure mode of each of the one or more assets. Finally, the method comprises analyzing the asset information using identified one of the plurality of prediction models for predicting the failures in each of the one or more assets.

Further, the present disclosure relates to a failure prediction system for predicting failures in a diverse set of asset types in an enterprise. The failure prediction system comprises a processor and a memory. The memory is communicatively coupled to the processor and stores processor-executable instructions, which on execution, cause the processor to receive asset information related to one or more assets from one or more data sources associated with the one or more assets. The one or more assets belong to one or more asset types. Further, the instructions cause the processor to determine an asset type and a failure mode of each of the one or more assets based on analysis of the asset information. Thereafter, the instructions cause the processor to select one of a plurality of prediction models to predict failures in each of the one or more assets based on the asset type and the failure mode of each of the one or more assets. Finally, the instructions cause the processor to analyze the asset information using identified one of the plurality of prediction models to predict the failures in each of the one or more assets.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
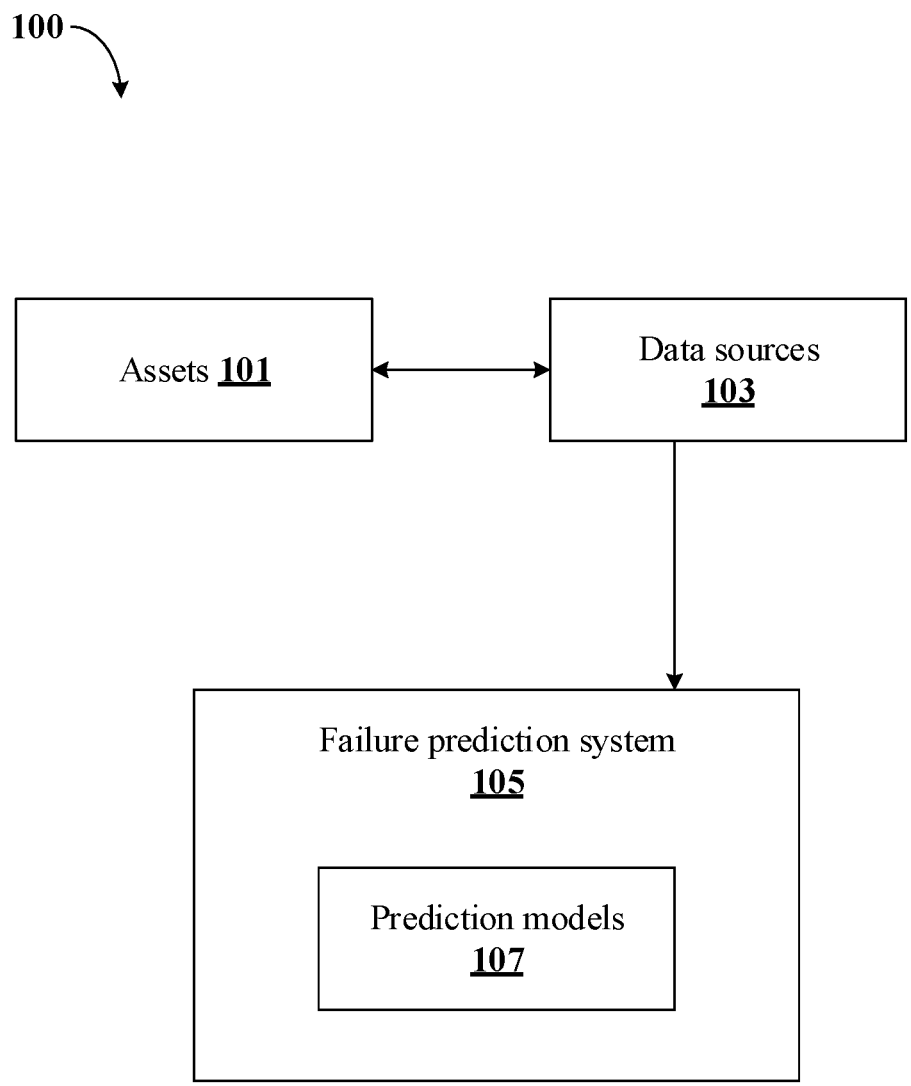
FIG. 1 illustrates an exemplary environment for predicting failures in a diverse set of asset types in an enterprise in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a failure prediction system for predicting failures in a diverse set of asset types in an enterprise. That is, the failure prediction system may be treated as a single generalized system that can predict failures on varied set of asset types in the enterprise. In an embodiment, various input variables like sensor readings and events like failure alarms are collected from the individual assets and are indexed based on a unique identifier corresponding to each of the assets. Further, the collected sensor readings and events information are segregated based on the asset identifier to build or select specific predictive models based on the asset type. Models in the model repository are refreshed periodically. Also, the failure prediction system may generate predictions for necessary preventive maintenance based on near real-time events received from that asset. Subsequently, a modelling approach is used to build various failure prediction models for predicting failures in each of the asset tapes. In an embodiment, each of the failure prediction models are trained with the metadata corresponding to each type of the assets.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment for predicting failures in a diverse set of asset types in an enterprise in accordance with some embodiments of the present disclosure.

In some implementations, the environment 100 may include one or more assets 101 of an enterprise, one or more data sources 103 associated with the one or more assets 101 and a failure prediction system 105. The one or more assets 101 may include various hardware resources being used in the enterprise. As an example, in an enterprise that manages water supply, the one or more assets 101 may include, without limiting, a water reservoir, pressure pumps, pipes, supply meters and the like. In an embodiment, the one or more assets 101 may belong to a diverse set of asset types.

In an embodiment, the one or more data sources 103 associated with the one or more assets 101 may include, without limiting to, one or more sensors configured with the one or more assets 101 and data logs indicating operation, maintenance and servicing of the one or more assets 101. As an example, the one or more sensors may include, without limitation, temperature sensors, pressure sensors, emergency event indicators and alarms. The information collected by the one or more sensors may be used to determine an operational state of the one or more assets 101 at any required point of time. Further, the data logs may include, without limitation, operational data collected by monitoring usage and behaviour of the one or more assets 101 over a period of time.

In an embodiment, the failure prediction system 105 may be any computing device including, but not limited to, a desktop computer, a laptop or a smartphone, which may be configured with a plurality of processing models for predicting failures in the one or more assets 101. In some implementations, the failure prediction system 105 may be deployed within the enterprise and locally connected to the one or more data sources 103 for receiving asset information related to the one or more assets 101. In alternative implementations, the failure prediction system 105 may be deployed as a centralized server and communicatively connected with the one or more data sources 103 for receiving the asset information.

In an embodiment, the failure prediction system 105 may receive the asset information in real-time or at predetermined intervals. As an example, the asset information may be automatically retrieved from the one or more data sources 103 at each interval of 1 hour. Further, the asset information may include, without limiting to, an asset identifier corresponding to each of the one or more assets 101, values of operating parameters of the one or more assets 101, values of operating parameters of an ambient environment of the one or more assets 101, events indicating changes in operational states of the one or more assets 101 and alarms indicating variations in operation of the one or more assets 101. In an embodiment, subsequent to receiving the asset information, the failure prediction system 105 may perform one or more data cleansing operations on the asset information for eliminating one or more irregularities in the asset information. As an example, the one or more irregularities may include, without limiting to, redundancy in information, incomplete information, pseudo and/or incorrect observations and the like. After performing the one or more data cleansing operations, the asset information may be analysed to determine sufficiency of the asset information based on comparison of the asset information with one or more predetermined asset parameters.

In an embodiment, the failure prediction system 105 performs data sufficiency check by determining an asset type from the asset information and a failure mode of each of the one or more assets 101. The asset type may indicate a group and/or an asset-class to which the one or more assets 101 may belong. As an example, the asset type may include, without limiting to, asset categories such as large machineries, movable equipment, small tools or end-user products. Further, the failure mode of each of the one or more assets 101 may be indicate a cause and/or an effect of a failure in the one or more assets 101. As an example, the failure mode may include without limiting to, premature termination of operation, failure during the operation, failure to terminate operation within a prescribed time, degraded or excessive operational capability of the asset and the like.

In an embodiment, upon determining the asset type and the failure mode of each of the one or more assets 101, the failure prediction system 105 may select one of a plurality of prediction models 107 for predicting failures in each of the one or more assets 101. In an embodiment, the plurality of prediction models 107 may be pre-trained learning models, which are trained with information related to various asset types and failure modes of the one or more assets 101. In an implementation, each of the plurality of prediction models 107 may be trained to predict failures in one of the various asset types. That is, the selection of one of the plurality of prediction models 107 for predicting the failures may be based on the asset type and the failure mode of the one or more assets 101. Therefore, selection of the prediction models 107 includes comparing the asset type and the failure mode of each of the one or more assets 101 with pretrained asset type and pretrained failure mode used for training each of the plurality of prediction models 107. In an implementation, each of the plurality of prediction models 107 may be stored in a model repository associated with the failure prediction system 105.

In an embodiment, upon selecting one of the plurality of prediction models 107 for predicting the failures, the failure prediction system 105 may analyse the asset information using selected one of the plurality of prediction models 107 for predicting the failures in each of the one or more assets 101. Here, the selected one of the plurality of prediction models 107 may compare the asset information of the one or more assets 101 with corresponding asset information used for training the selected one of the plurality prediction models 107, for identifying failures in the one or more assets 101. However, if the asset type and the failure mode of the one or more assets 101 do not match with the pretrained asset type and the pretrained failure mode of any of the plurality of prediction models 107, then the failure prediction system 105 may dynamically create a new prediction models 107 for predicting failures in the one or more assets 101. Further, the newly created prediction models 107 may be stored in the model repository and used for predicting failures in the one or more assets 101 in future instances.

In an embodiment, the failure prediction system 105 may perform additional training of the plurality of prediction models 107 in the model repository when prediction accuracy level of the plurality of prediction models 107 is less than a predetermined threshold. As example, the predetermined threshold may be 90% accuracy. That is, when the accuracy of predictions made by the plurality of prediction models 107 is less than 90%, the plurality of prediction models 107 may be trained with relevant asset information for enhancing accuracy of the plurality of prediction models 107.

In an embodiment, upon predicting the failures in the one or more assets 101, the failure prediction system 105 may generate one or more notification events that include information related to the predicted failures. Further, the failure prediction system 105 may transmit the one or more notification events to predetermined asset management personnel such as asset managers, asset maintenance and service supervisors, field technicians and the like. Thus, the failure prediction system 105 proactively predicts the failures in the one or more assets 101 and helps in preventing occurrence of the predicted failures.

Figure 2:
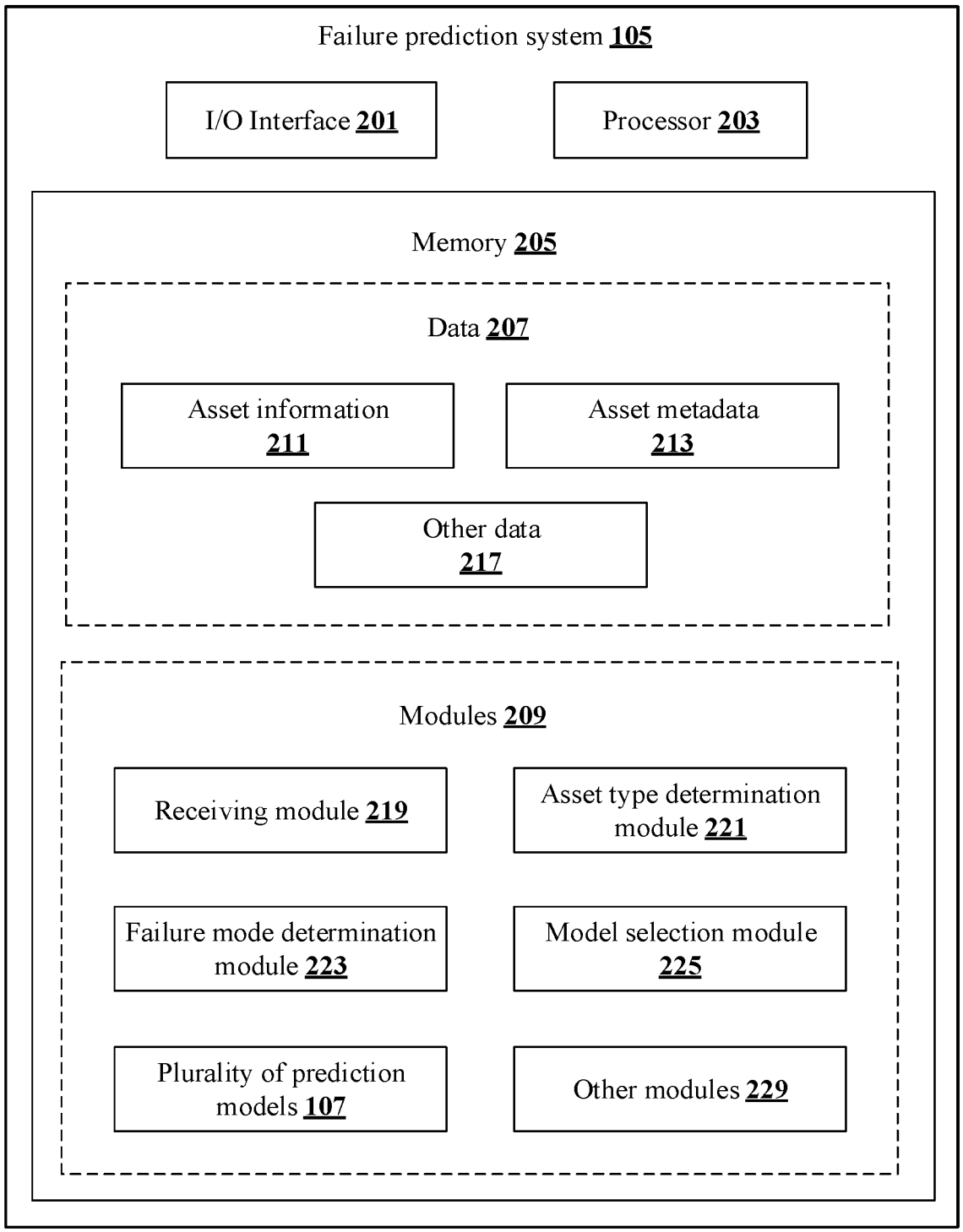
FIG. 2 shows a detailed block diagram illustrating a failure prediction system in accordance with some embodiments of the present disclosure.

FIG. 2 shows a detailed block diagram illustrating a failure prediction system 105 in accordance with some embodiments of the present disclosure.

In some implementations, the failure prediction system 105 may include an I/O interface 201, a processor 203, and a memory 205. The I/O interface 201 may be configured to receive asset information 211 related to one or more assets 101 from one or more data sources 103 associated with the one or more assets 101. The memory 205 may be communicatively coupled to the processor 203 and may store data 207 and one or more modules 209. The processor 203 may be configured to perform one or more functions of the failure prediction system 105 for predicting failures in a diverse set of asset types, using the data 207 and the one or more modules 209.

In an embodiment, the data 207 may include, without limitation, asset information 211, asset metadata 213 and other data 217. In some implementations, the data 207 may be stored within the memory 205 in the form of various data structures. Additionally, the data 207 may be organized using data models, such as relational or hierarchical data models. The other data 217 may store various temporary data and files generated by one or more modules 209 while performing various functions of the failure prediction system 105. As an example, the other data 217 may also include an asset identifier and a model repository associated with the failure prediction system 105.

In an embodiment, the asset information 211 may include all the information related to the one or more assets 101 in the enterprise. The asset information 211 may be received from the one or more data sources 103 associated with the one or more assets 101. As an example, the asset information 211 may include, without limiting to, an asset identifier corresponding to each of the one or more assets 101, values of operating parameters of the one or more assets 101, values of operating parameters of an ambient environment of the one or more assets 101, events indicating changes in operational states of the one or more assets 101 and alarms indicating variations in operation of the one or more assets 101. Here, the asset identifier may be a unique identity of the asset which may be to identify the location, type and operational role of the asset in the enterprise. Operating parameters of the assets 101 may include parameters such as up-time of the asset, age of the asset, failure history of the asset, ideal operating conditions for proper functioning of the asset and the like. Operating parameters of the ambient environment may be external parameters that affect functioning of the asset and may include, without limiting to, ambient temperature, surrounding pressure and the like. In an embodiment, the asset information 211 may be received in various forms including, without limiting to, alarms, signals and event notifications.

In an embodiment, the asset metadata 213 may include, without limiting to, list of asset identifiers of each of the one or more assets 101 in the enterprise, the asset type of each of the one or more assets 101, corresponding failure modes, operational parameters or attributes, event occurrence details of each of the one or more assets 101. The asset metadata 213 may be used for determining the asset type and the failure mode of the one or more assets 101 based on the asset identifier of the one or more assets 101. Further, whenever new assets 101 have been deployed in the enterprise, the asset metadata 213 may be updated to include asset identifiers of the newly deployed assets 101.

In an embodiment, each of the data 207 may be processed by the one or more modules 209. In some implementations, the one or more modules 209 may be communicatively coupled to the processor 203 for performing one or more functions of the failure prediction system 105. In an implementation, the one or more modules 209 may include, without limiting to, a receiving module 219, an asset type determination module 221, a failure mode determination module 223, a model selection module 225, plurality of prediction models 107 and other modules 229.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 229 may be used to perform various miscellaneous functionalities of the failure prediction system 105. It will be appreciated that such one or more modules 209 may be represented as a single module or a combination of different modules.

In an embodiment, the receiving module 219 may be configured for receiving the asset information 211 related to the one or more assets 101 from the one or more data sources 103 associated with the one or more assets 101. The receiving module 219 may receive the asset information 211 directly from the one or more data sources 103 or may import the asset information 211 from an intermediate storage associated with the failure prediction system 105. That is, the asset information 211 may be streamed in real-time or ingested periodically in batches. In some embodiments, the one or more data sources 103 may deliver the asset information 211 continuously into a common data stream for ensuring the real-time data ingestion. The real-time data streaming/ingestion process may support continuous collection of the asset information 211 using streaming components like message queues. In alternative embodiments, the asset information 211 from the one or more data sources 103 may be collected at periodic frequencies into files and provided for ingestion in batches. The batch ingestion process may support file-based ingestion from files in text formats like Comma-Separated Values (CSV), JavaScript Object Notion (JSON) and the like. The batch ingestion process may also support ingestion of asset information 211 from semi-structured machine log formats.

In an embodiment, the receiving module 219 may be further configured for performing one or more data cleansing operations on the received asset information 211 for eliminating one or more irregularities in the asset information 211. As an example, the one or more data cleansing operations may include multiple activities such as filtering out invalid or erroneous data from the asset information 211, replacing missing values, de-duplication of the asset information 211 and the like. Once the asset information 211 is converted into meaningful/useful information, the receiving module 219 may determine if the received asset information 211 is sufficient for predicting the failure in the one or more assets 101. The sufficiency of the asset information 211 may be determined, using the asset metadata 213 stored in the metadata store and list of requisite variables based on the asset failure mode from failure mode determination module 223. Firstly, the receiving module 219 may process the asset information 211 to extract the asset identifier corresponding to each of the one or more assets 101 from the asset information 211. Subsequently, the extracted asset identifier may be compared with the list of asset identifiers and other asset metadata 213 stored in metadata store for identifying the asset type of each of the one or more assets 101. Thereafter, a list of data variables, corresponding to each of the one or more assets 101, that are required to be derived for predicting the failures in each of the one or more assets 101 may be derived from the asset metadata 213. Finally, the data in the asset information 211 may be mapped with each of the data variables to determine sufficiency of the asset information 211.

Figure 3A:
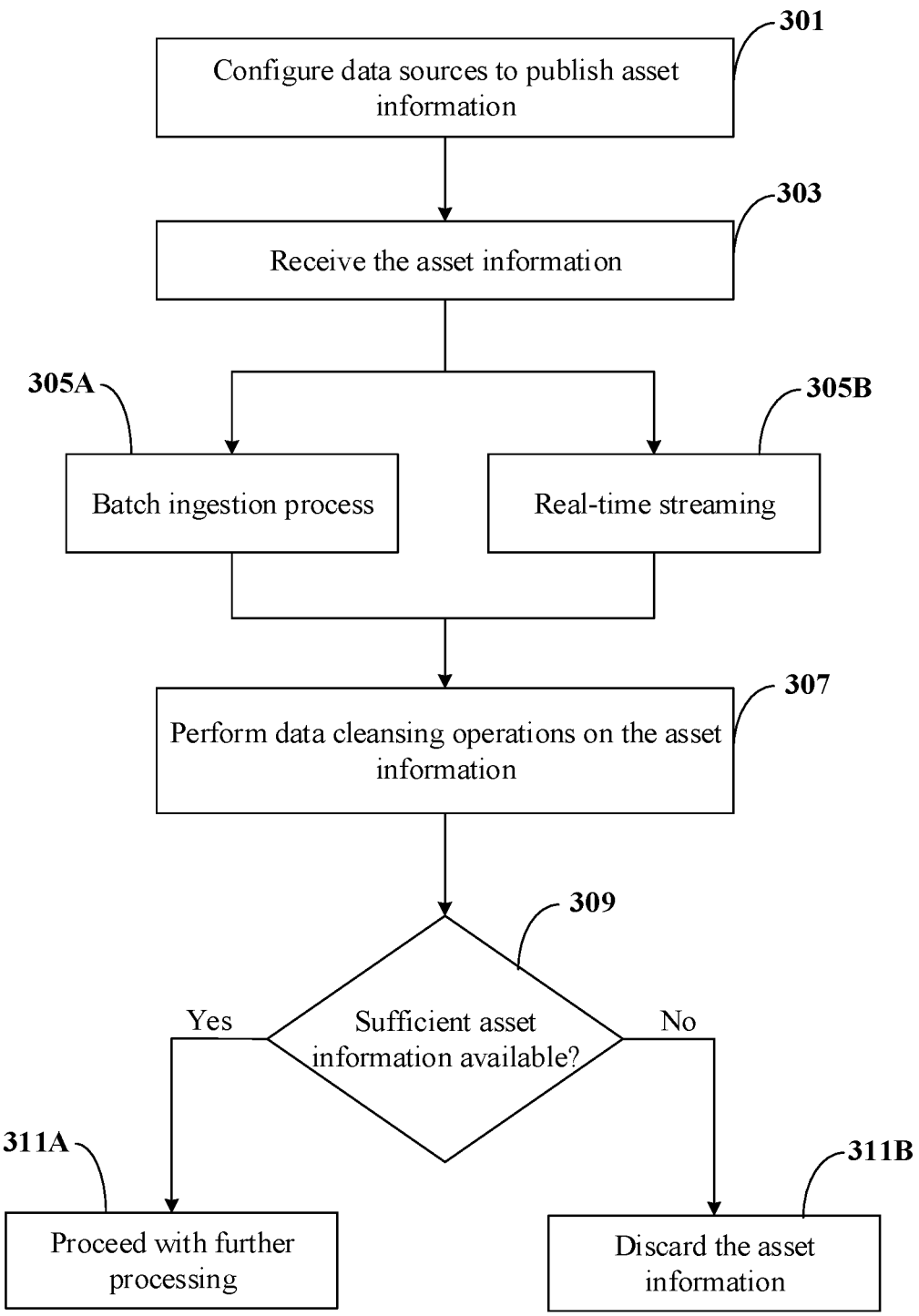
FIG. 3A shows a flowchart illustrating a method for checking sufficiency of asset information in accordance with some embodiments of the present disclosure.

The process of receiving the asset information 211 and determining sufficiency of the asset information 211 is illustrated in flowchart of FIG. 3A. At step 301, each of the one or more data sources 103 may be configured for publishing and/or transmitting the asset information 211 to the failure prediction system 105. At step 303, the failure prediction system 105 may receive the asset information 211 using at least one of the batch ingestion process (step 305A) or the real-time streaming process (step 305B). At step 307, one or more data cleansing operations may be performed on the received asset information 211. Subsequently, at step 309, the sufficiency of the asset information 211 may be determined using the process illustrated in the above description. If the asset information 211 is determined to be sufficient, then the asset information 211 may be forwarded for further processing at step 311A. However, if the asset information 211 is determined to be insufficient, the asset information 211 may be discarded at step 311B. Thereafter, the failure prediction system 105 may receive fresh asset information 211 from the one or more data sources 103, until sufficient asset information 211 is collected for predicting the failures in the one or more assets 101.

In an embodiment, the asset type determination module 221 may be configured for determining the asset type of each of the one or more assets 101 using the asset metadata 213 stored in the metadata store. In an embodiment, the asset type of each of the one or more assets 101 may be determined by comparing the asset identifier of each of the one or more assets 101 with the list of asset identifiers comprised in the asset metadata 213. Similarly, the failure mode determination module 223 may be used for determining the failure mode of each of the one or more assets 101 by comparing the asset information 211 and the asset metadata 213.

In an embodiment, the model selection module 225 may be used for selecting one of the plurality of prediction models 107 for predicting failures in each of the one or more assets 101. In other words, the model selection module 225 may be used for identifying a correct model required for predicting failures in the one or more assets 101 based on the asset type and the failure mode of the one or more assets 101. In an embodiment, the model selection module 225 may compare the asset type and the failure mode of each of the one or more assets 101 with a predetermined asset type and a predetermined failure mode used for training each of the plurality of prediction models 107 for selecting the right model from the plurality of prediction models 107.

In an embodiment, the plurality of prediction models 107 may be used for analysing the asset information 211 related to the one or more assets 101 and predict the failures in the one or more assets 101. In some implementations, each of the plurality of prediction models 107 may be stored in a model repository associated with the failure prediction system 105. The model repository may enlist the plurality of prediction models 107 available in the failure prediction system 105, along with information such as the asset type and the failure modes used for training each of the plurality of prediction models 107. In an embodiment, the plurality of prediction models 107 may be created and/or built using a model building approach. During model building, each of the plurality of prediction models 107 are trained using analytical and machine learning techniques that are trained for different asset types and failure modes. Further, the analysis results such as significant variables, model factors and failure propensity scores, generated by each of the plurality of prediction models 107 may be stored separately in a memory portion called 'results zone', within the memory 205 of the failure prediction system 105, as a reference for real-time prediction of the failures.

In an embodiment, the model repository may include multiple prediction models 107 for predicting failures in a particular asset type for different failure modes. Therefore, both the asset type and the failure mode of each of the one or more assets 101 may be used for selecting the right prediction model from the model repository. Once the right prediction model is selected, the selected prediction model may be moved to an active memory of the failure prediction system 105 for analysing incoming asset information 211 in real-time. Further, the results generated by the selected prediction model may be stored back on the model repository, which in turn may be used to score the selected prediction model based on the accuracy of the predictions made by the selected prediction model.

In an embodiment, the level of accuracy of predictions made by each of the plurality of prediction models 107 may be analysed periodically for evaluating performance of each of the plurality of prediction models 107. Suppose, if the prediction accuracy of the prediction models 107 is below a predetermined threshold value, then such prediction models 107 may be re-trained with relevant training data for improving the prediction accuracy. Subsequently, the model repository may be updated with the re-trained prediction model having improved prediction accuracy. The above process of analysing the prediction accuracy of the prediction models 107, re-training and/or re-modelling of the prediction models 107 may be carried out as a part of model management process. The model management process may be performed at regular periodical intervals to monitor and improvise prediction results of the plurality of prediction models 107. Additionally, the model management process may also include constructing new prediction models 107 when the relevant prediction models 107 for prediction failures in the one or more assets 101 having specific asset type and failure mode are not available in the model repository. Subsequent to constructing the new prediction models 107, the model repository may be updated with the new prediction models 107 and the prediction accuracy of the new prediction models 107.

Figure 3B:
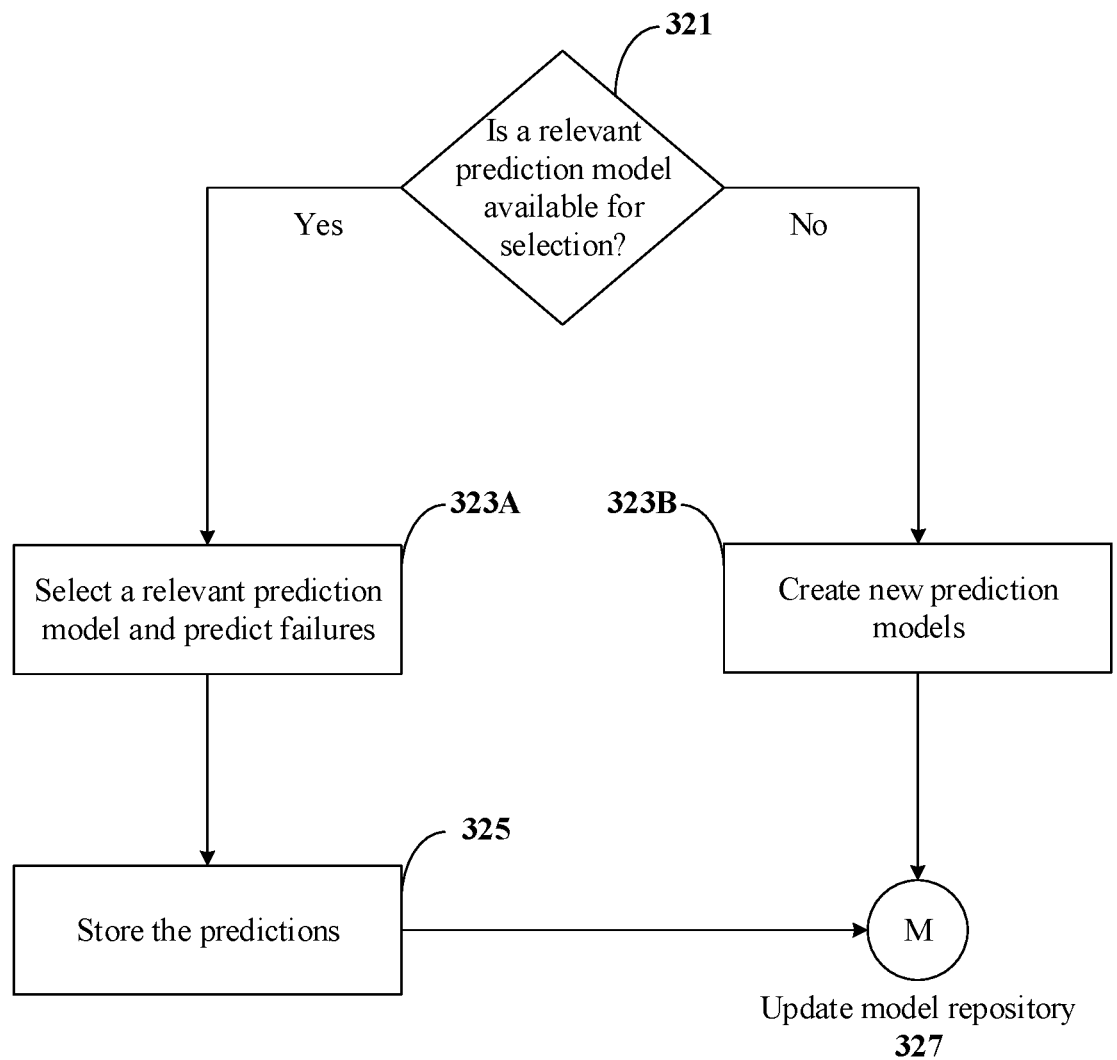
FIG. 3B shows a flowchart illustrating a method of selecting a failure prediction model in accordance with some embodiments of the present disclosure.
Figure 3C:
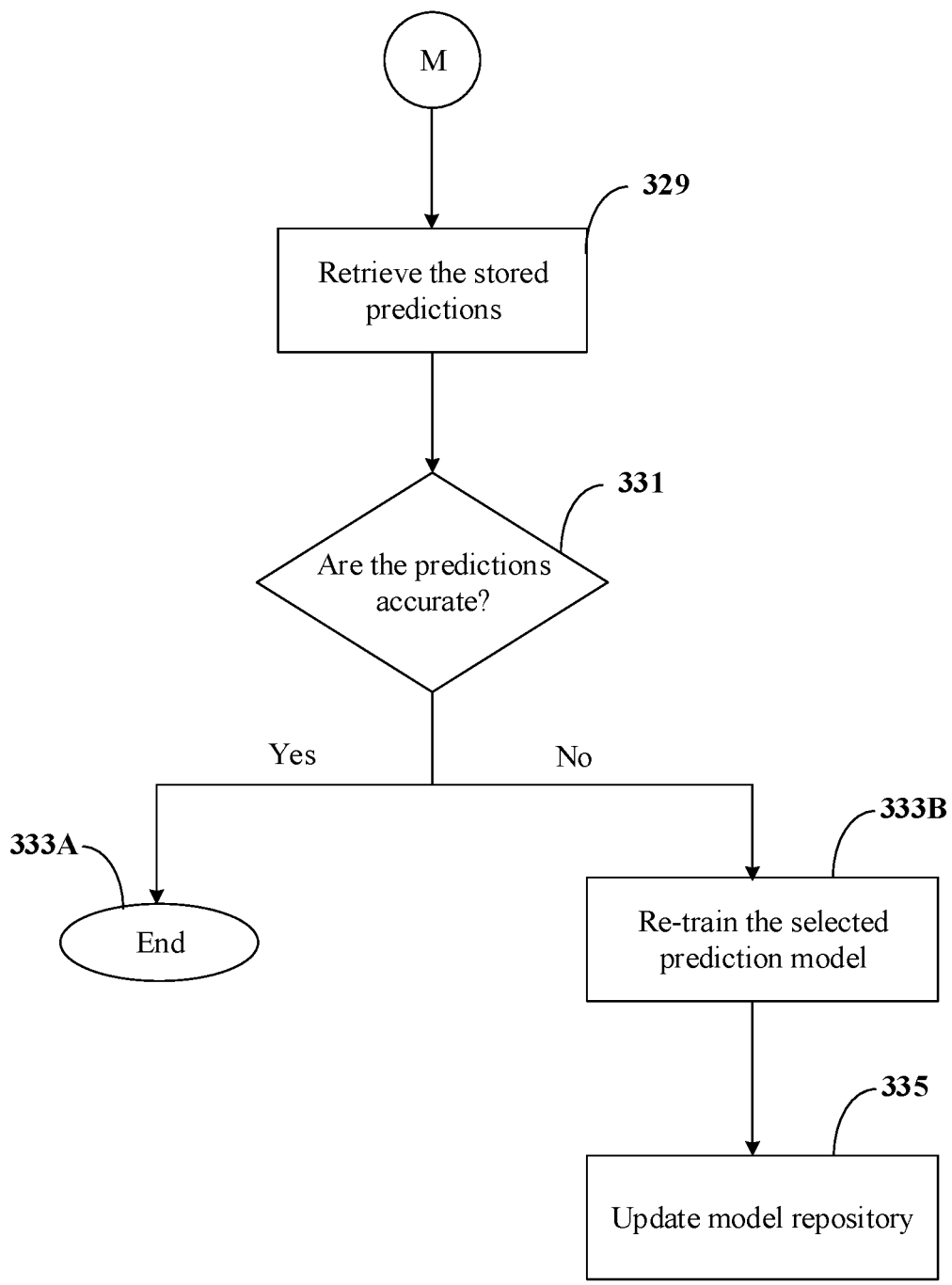
FIG. 3C shows a flowchart illustrating a method of managing the failure prediction models in accordance with some embodiments of the present disclosure.

FIG. 3B and FIG. 3C illustrate flowcharts that summarize the model building and model management processes involved in the model repository. As shown in FIG. 3B, at step 321, the model repository may be checked to determine if there exist any relevant prediction models for analysing the asset information 211. If a relevant prediction model is identified, then at step 323A, the identified relevant prediction model may be selected for predicting failures in the asset. Further, at step 325, the results of prediction generated by the selected predication model may be stored in the results zone of the model repository and subsequently transmitted to the concerned personnel via appropriate notification events. On the other hand, if the model repository does not have a relevant prediction model, a new prediction model may be dynamically created at step 323B. Thereafter, at step 327, each of the prediction models stored in the model repository, including the newly created prediction model, may be periodically trained and updated using a model management process. The model management process is illustrated in FIG. 3C.

As shown in FIG. 3C, at step 329, the results of prediction generated by the selected prediction model may be retrieved from the results zone and analysed for determining prediction accuracy of the selected prediction model, at step 331. If the prediction accuracy is more than the predetermined threshold, then the prediction model may not be subjected for further training. However, if the prediction accuracy is less than the predetermined threshold, then, at step 333B, the selected prediction model may be re-trained to improvise the prediction accuracy of the selected prediction model. Further, at step 335, the model repository may be updated with the re-trained prediction model. Thereafter, the updated model repository may be used for predicting failures in the one or more assets 101 in future instances.

Figure 4:
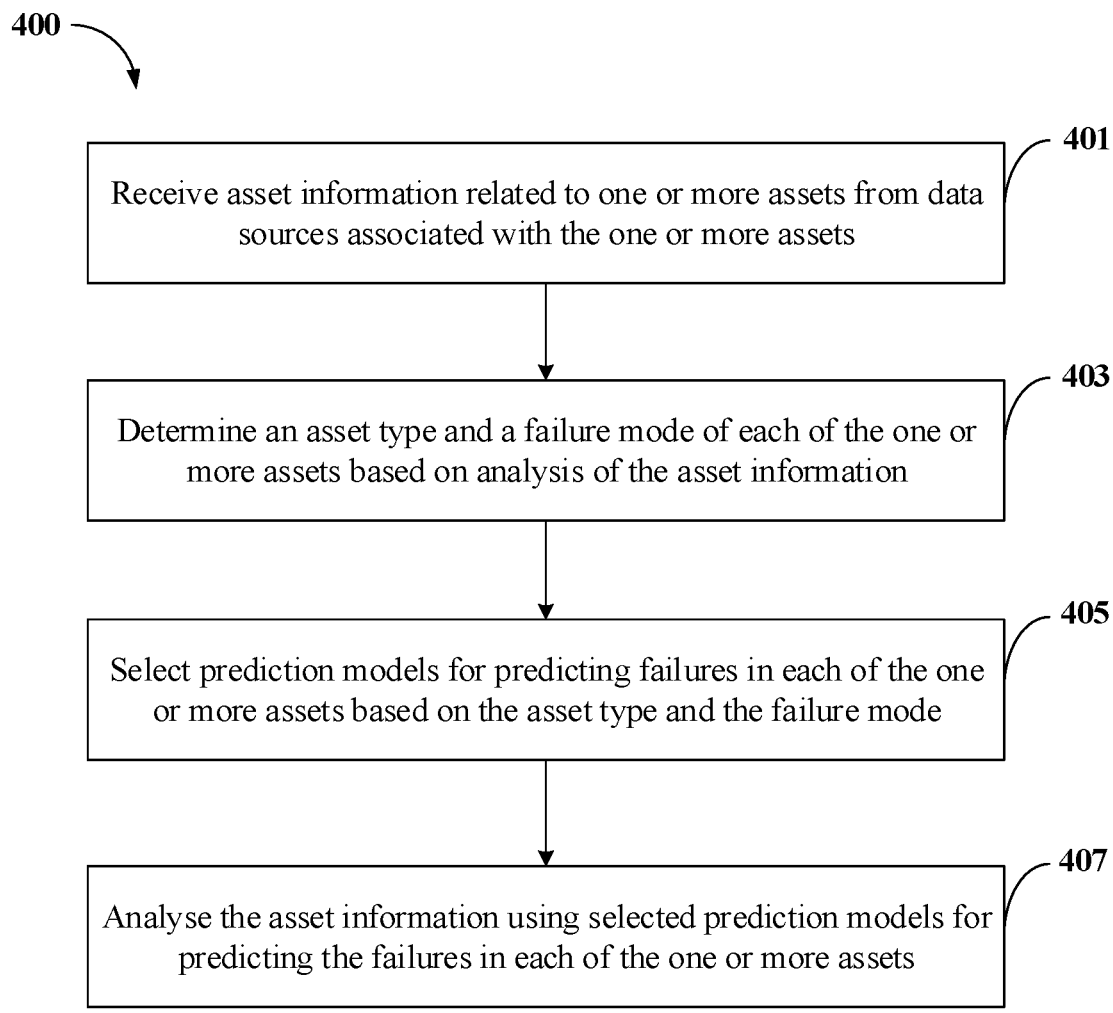
FIG. 4 shows a flowchart illustrating a method of predicting failures in a diverse set of asset types in an enterprise in accordance with some embodiments of the present disclosure.

FIG. 4 shows a flowchart illustrating a method of predicting failures in a diverse set of asset types in an enterprise in accordance with some embodiments of the present disclosure.

As illustrated in FIG. 4, the method 400 may include one or more blocks illustrating a method of predicting failures in a diverse set of asset types in an enterprise using the failure prediction system 105 illustrated in FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the method 400 includes receiving, by the failure prediction system 105, asset information 211 related to one or more assets 101 from one or more data sources 103 associated with the one or more assets 101. The one or more assets 101 belong to one or more asset types. As an example, the asset information 211 may include, without limiting to, at least one of an asset identifier corresponding to each of the one or more assets 101, values of operating parameters of the one or more assets 101, values of operating parameters of an ambient environment of the one or more assets 101, events indicating changes in operational states of the one or more assets 101 and alarms indicating variations in operation of the one or more assets 101. Further, the one or more data sources 103 may include, without limiting to, one or more sensors configured with the one or more assets 101 and data logs indicating operation, maintenance and servicing of the one or more assets 101. In an embodiment, the asset information 211 may be received in real-time or at predetermined periodical intervals.

At block 403, the method 400 includes determining, by the failure prediction system 105, an asset type and a failure mode of each of the one or more assets 101 based on analysis of the asset information 211. In an embodiment, determining the asset type and the failure mode of each of the one or more assets 101 includes determining an asset identifier corresponding to the each of the one or more assets 101 using the asset information 211. Further, the method includes determining the asset type and the failure mode of each of the one or more assets 101 based on the asset identifier and asset metadata 213 stored in a metadata store associated with the failure prediction system 105. The method includes determining sufficiency of the asset information 211 based on comparison of the asset information 211 with one or more predetermined asset parameters. In some implementations, receiving the asset information 211 includes performing one or more data cleansing operations on the asset information 211 for eliminating one or more irregularities in the asset information 211. In an embodiment, each of the one or more asset types may be associated with a plurality of prediction models 107 and each of the plurality of prediction models 107 may be associated with a predetermined failure mode.

At block 405, the method 400 includes selecting, by the failure prediction system 105, one of a plurality of prediction models 107 for predicting failures in each of the one or more assets 101 based on the asset type and the failure mode of each of the one or more assets 101. In an embodiment, selecting the one of the plurality of prediction models 107 includes comparing the asset type and the failure mode of each of the one or more assets 101 with pretrained asset type and pretrained failure mode used for training each of the plurality of prediction models 107. Further, the method includes selecting one of the plurality of prediction models 107 for each of the one or more assets 101 based on the comparison.

At block 407, the method 400 includes analyzing, by the failure prediction system 105, the asset information 211 using selected one of the plurality of prediction models 107 for predicting the failures in each of the one or more assets 101. In an embodiment, when the asset type and the failure mode of the one or more assets 101 do not match with the pretrained asset type and the pretrained failure mode of the plurality of prediction models 107, new prediction models 107 may be dynamically created for predicting failures in the one or more assets 101. Further, each of the new prediction models 107 may be stored in a model repository associated with the failure prediction system 105 for subsequent prediction of failures in the one or more assets 101. In an embodiment, the method 400 also includes training the plurality of prediction models 107 for predicting failures in the one or more assets 101 when prediction accuracy level of the plurality of prediction models 107 is less than a predetermined threshold.

Computer System

Figure 5:
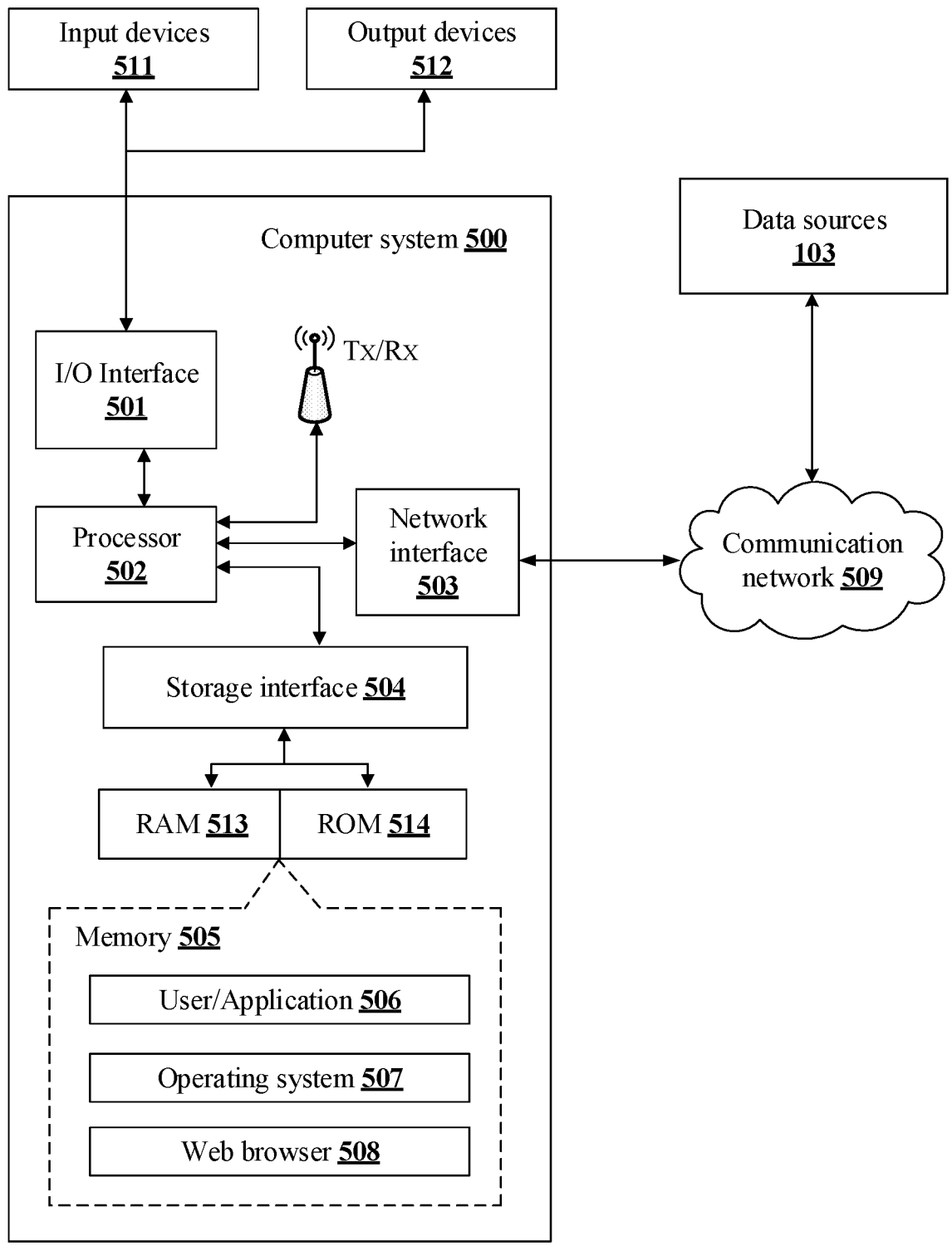
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be the failure prediction system 105 illustrated in FIG. 1, which may be used for predicting failures in a diverse set of asset types in an enterprise. The computer system 500 may include a central processing unit ("CPU" or "processor") 502. The processor 502 may comprise at least one data processor for executing program components for executing user- or system-generated business processes. A user may include a person, an asset manager/supervisor, or any system/sub-system being operated parallelly to the computer system 500. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 503 and the communication network 509, the computer system 500 may communicate with one or more data sources 103 associated with one or more assets 101 for receiving asset information 211 related to the one or more assets 101 from one or more data sources 103 associated with the one or more assets 101.

In an implementation, the communication network 509 may be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/ Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiments of the present disclosure are illustrated herein.

In an embodiment, the method of present disclosure helps in predicting failures in a diverse set of asset types in an enterprise.

In an embodiment, the failure prediction system of present disclosure may function as a universal framework for predicting failures in a diverse set of asset types. Thus, the failure prediction system of present disclosure helps to avoid expenditure involved in deploying multiple failure prediction systems that are specific to only a particular type of assets.

In an embodiment, the method of present disclosure provides a proactive modeling approach for dynamically predicting failures in the diverse set of asset types.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of predicting failures in a diverse set of asset types in an enterprise, the method comprising:
   receiving, by a failure prediction system, asset information related to one or more assets from one or more data sources associated with the one or more assets, wherein the one or more assets belong to one or more asset types;
   determining, by the failure prediction system, an asset type and a failure mode of each of the one or more assets based on analysis of the asset information;
   selecting, by the failure prediction system, one of a plurality of prediction models for predicting failures in each of the one or more assets based on the asset type and the failure mode of each of the one or more assets, wherein selecting the one of the plurality of prediction models for predicting failures in each of the one or more assets comprises:
      comparing the asset type and the failure mode of each of the one or more assets with pretrained asset type and pretrained failure mode used for training each of the plurality of prediction models; and
   analysing, by the failure prediction system, the asset information using selected one of the plurality of prediction models for predicting the failures in each of the one or more assets.

2. The method as claimed in claim 1, wherein the asset information comprises at least one of an asset identifier corresponding to each of the one or more assets, values of operating parameters of the one or more assets, values of operating parameters of an ambient environment of the one or more assets, events indicating changes in operational states of the one or more assets or alarms indicating variations in operation of the one or more assets.

3. The method as claimed in claim 1, wherein the asset information is received in real-time or at predetermined periodical intervals.

4. The method as claimed in claim 1, wherein the one or more data sources comprises one or more sensors configured with the one or more assets and data logs indicating operation, maintenance and servicing of the one or more assets.

5. The method as claimed in claim 1, wherein receiving the asset information further comprises:
   performing one or more data cleansing operations on the asset information for eliminating one or more irregularities in the asset information; and
   determining sufficiency of the asset information based on comparison of the asset information with one or more predetermined asset parameters.

6. The method as claimed in claim 1, wherein determining the asset type and the failure mode of each of the one or more assets comprises:
   determining an asset identifier corresponding to the each of the one or more assets using the asset information; and
   determining the asset type and the failure mode of each of the one or more assets based on the asset identifier and asset metadata stored in a metadata store associated with the failure prediction system.

7. The method as claimed in claim 1, wherein selecting the one of the plurality of prediction models for predicting failures in each of the one or more assets further comprises:
   selecting one of the plurality of prediction models for each of the one or more assets based on comparison.

8. The method as claimed in claim 7 further comprises dynamically creating new prediction models for predicting failures in the one or more assets when the asset type and the failure mode of the one or more assets do not match with the pretrained asset type and the pretrained failure mode of the plurality of prediction models, wherein each of the new prediction models are stored in a model repository associated with the failure prediction system for subsequent prediction of failures in the one or more assets.

9. The method as claimed in claim 1 further comprises training the plurality of prediction models for predicting failures in the one or more assets when prediction accuracy level of the plurality of prediction models is less than a predetermined threshold.

10. The method as claimed in claim 1 further comprises generating and transmitting one or more notification events to asset management personnel, associated with the one or more assets, upon predicting failures in the one or more assets.

11. The method as claimed in claim 1, wherein each of the one or more asset types is associated with a plurality of prediction models and each of the plurality of prediction models is associated with a predetermined failure mode.

12. A failure prediction system for predicting failures in a diverse set of asset types in an enterprise, the failure prediction system comprising:
   a processor; and
   a memory, communicatively coupled to the processor, wherein the memory stores processor-executable instructions, which on execution, cause the processor to:
      receive asset information related to one or more assets from one or more data sources associated with the one or more assets, wherein the one or more assets belong to one or more asset types;
      determine an asset type and a failure mode of each of the one or more assets based on analysis of the asset information;
      select one of a plurality of prediction models to predict failures in each of the one or more assets based on the asset type and the failure mode of each of the one or more assets, wherein selecting the one of the plurality of prediction models for predicting failures in each of the one or more assets comprises:
         comparing the asset type and the failure mode of each of the one or more assets with pretrained asset type and pretrained failure mode used for training each of the plurality of prediction models; and
      analyse the asset information using selected one of the plurality of prediction models to predict the failures in each of the one or more assets.

13. The failure prediction system as claimed in claim 12, wherein the asset information comprises at least one of an asset identifier corresponding to each of the one or more assets, values of operating parameters of the one or more assets, values of operating parameters of an ambient environment of the one or more assets, events indicating changes in operational states of the one or more assets or alarms indicating variations in operation of the one or more assets.

14. The failure prediction system as claimed in claim 12, wherein the processor receives the asset information in real-time or at predetermined periodical intervals.

15. The failure prediction system as claimed in claim 12, wherein the one or more data sources comprises one or more sensors configured with the one or more assets and data logs indicating operation, maintenance and servicing of the one or more assets.

16. The failure prediction system as claimed in claim 12, wherein the processor is further configured to:
perform one or more data cleansing operations on the asset information to eliminate one or more irregularities in the asset information; and
determine sufficiency of the asset information based on comparison of the asset information with one or more predetermined asset parameters.

17. The failure prediction system as claimed in claim 12, wherein to determine the asset type of each of the one or more assets, the processor is configured to:
determine an asset identifier corresponding to the each of the one or more assets using the asset information; and
determine the asset type and the failure mode of each of the one or more assets based on the asset identifier and asset metadata stored in a metadata store associated with the failure prediction system.

18. The failure prediction system as claimed in claim 12, wherein to select the one of the plurality of prediction models for predicting failures in each of the one or more assets, the processor is further configured to:
select one of the plurality of prediction models for each of the one or more assets based on comparison.

19. The failure prediction system as claimed in claim 18, wherein the processor is configured to dynamically crate new prediction models for predicting failures in the one or more assets when the asset type and the failure mode of the one or more assets do not match with the pretrained asset type and the pretrained failure mode of the plurality of prediction models, wherein the processor stores each of the new prediction models in a model repository associated with the failure prediction system for subsequent prediction of failures in the one or more assets.

20. The failure prediction system as claimed in claim 12, wherein the processor is configured to train the plurality of prediction models for predicting failures in the one or more assets when prediction accuracy level of the plurality of prediction models is less than a predetermined threshold.

21. The failure prediction system as claimed in claim 12, wherein the processor is configured to generate and transmit one or more notification events to asset management personnel, associated with the one or more assets, upon predicting failures in the one or more assets.

22. The failure prediction system as claimed in claim 12, wherein the processor associates each of the one or more asset types with a plurality of prediction models and each of the plurality of prediction models with a predetermined failure mode.

* * * * *